US010550750B2

(12) United States Patent
Kuramashi et al.

(10) Patent No.: US 10,550,750 B2
(45) Date of Patent: Feb. 4, 2020

(54) EXHAUST DEVICE OF ENGINE

(71) Applicant: MAZDA MOTOR CORPORATION, Hiroshima (JP)

(72) Inventors: Taku Kuramashi, Hatsukaichi (JP); Keishi Kitabatake, Hiroshima (JP); Tamotsu Takamure, Hiroshima (JP); Toshiaki Kamo, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 52 days.

(21) Appl. No.: 15/905,502

(22) Filed: Feb. 26, 2018

(65) Prior Publication Data

US 2018/0258822 A1    Sep. 13, 2018

(30) Foreign Application Priority Data

Mar. 10, 2017  (JP) .................................. 2017-046758
Nov. 22, 2017  (JP) .................................. 2017-224927

(51) Int. Cl.

| F01N 11/00 | (2006.01) |
| F01N 3/021 | (2006.01) |
| F02M 26/15 | (2016.01) |
| F01N 13/00 | (2010.01) |
| F01N 3/10 | (2006.01) |
| F01N 3/035 | (2006.01) |
| F01N 13/08 | (2010.01) |

(52) U.S. Cl.
CPC ............ *F01N 11/002* (2013.01); *F01N 3/021* (2013.01); *F01N 3/035* (2013.01); *F01N 3/101* (2013.01); *F01N 13/009* (2014.06); *F01N 13/0097* (2014.06); *F01N 13/08* (2013.01); *F02M 26/15* (2016.02); *F01N 2340/02* (2013.01); *F01N 2470/18* (2013.01); *Y02T 10/22* (2013.01)

(58) Field of Classification Search
CPC .. F01N 11/002; F01N 13/009; F01N 13/0097; F01N 13/08; F01N 3/021; F01N 3/035; F01N 3/101; F01N 2340/02; F01N 2470/18; F02M 26/15; Y02T 10/22
See application file for complete search history.

(56) References Cited

U.S. PATENT DOCUMENTS

2003/0230075 A1    12/2003  Saito et al.
2012/0198838 A1 *   8/2012  Bruck ................. F01N 13/1805
                                                60/605.1

FOREIGN PATENT DOCUMENTS

| DE | 103 26 530 A1 | 1/2004 |
| EP | 1 845 244 A2 | 10/2007 |
| EP | 1845244 A2 * | 10/2007 | ........... F01N 3/0222 |
| JP | 2005-256805 A | 9/2005 |
| JP | 2011-117409 A | 6/2011 |

* cited by examiner

*Primary Examiner* — Brandon D Lee
(74) *Attorney, Agent, or Firm* — Studebaker & Brackett PC

(57) ABSTRACT

A downstream-side exhaust-gas takeout portion of a pressure-difference detector is provided between an exhaust-gas discharge port of a downstream-side cover and an EGR-gas takeout port so that a stable exhaust-gas pressure can be taken out (detected).

5 Claims, 12 Drawing Sheets

EXHAUST DEVICE OF ENGINE

BACKGROUND OF THE INVENTION

The present invention relates to an exhaust device of an engine.

Conventionally, a particulate filter to purify particulate matters contained in exhaust gas is provided at an upstream side in an exhaust path of an automotive-vehicle engine, such as a diesel engine or a gasoline engine.

The particulate matters contained in the exhaust gas are trapped at a partition wall of the particulate filter, and then removed by burning when a specified amount of particulate matters has accumulated.

It is known that the accumulation amount of particulate matters is sensed by detecting a difference between a pressure of the exhaust gas positioned on an upstream side of the particulate filter and another pressure of the exhaust gas positioned on a downward side of the particulate filter (a pressure difference of the exhaust gas) (see Japanese Patent Laid-Open Publication No. 2005-256805, for example).

Herein, while both the exhaust gas positioned on the upstream side of the particulate filter and the exhaust gas positioned on the downward side of the particulate filter are taken out for detection of the above-described pressure difference, there is a concern that the accuracy of the pressure difference detected may be deteriorated by being improperly influenced by the exhaust-gas flow in the exhaust path according to a structure of the exhaust device.

SUMMARY OF THE INVENTION

Accordingly, an object of the present invention is to improve the detection accuracy of the pressure difference by suppressing improper influence of the exhaust-gas flow.

The present invention is an exhaust device of an engine which comprises a particulate filter provided on an exhaust path of the engine and comprising a filter body to trap a particulate contained in exhaust gas which is discharged from the engine and a filter case housing the filter body, and a pressure-difference detector to detect a pressure difference between the exhaust gas positioned on an upstream side, in an exhaust-gas flow direction, of the filter body and the exhaust gas positioned on a downstream side, in the exhaust-gas flow direction, of the filter body, wherein the pressure-difference detector comprises an upstream-side exhaust-gas takeout portion which takes out the exhaust gas positioned on the upstream side, in the exhaust-gas flow direction, of the filter body, a downstream-side exhaust-gas takeout portion which takes out the exhaust gas positioned on the downstream side, in the exhaust-gas flow direction, of the filter body, and a pressure-difference detection portion to detect the pressure difference of the exhaust gas taken out by the upstream-side exhaust-gas takeout portion and the downstream-side exhaust-gas takeout portion, an exhaust-gas discharge port and an EGR-gas takeout port are provided at a downstream-side end portion of the filter case, and the downstream-side exhaust-gas takeout portion of the pressure-difference detector is provided between the exhaust-gas discharge port and the EGR-gas takeout port at the downstream-side end portion of the filter case.

According to the present invention, since the downstream-side exhaust-gas takeout port is provided between the exhaust-gas discharge port and the EGR-gas takeout port, the exhaust gas for pressure-difference detection which is taken out from each of the exhaust-gas takeout ports is not influenced greatly by a dynamic pressure of the exhaust-gas flow directed to the exhaust-gas discharge port and the EGR-gas takeout port. Accordingly, the accuracy of the pressure-difference detection can be properly improved.

In an embodiment of the present invention, the exhaust device further comprises an L-shaped exhaust pipe connected to an upstream side, in the exhaust-gas flow direction, of the filter case and configured to be bent in a L shape, wherein a step portion which is recessed outward is provided at a portion of an outer-periphery side wall of L-shaped bending of the L-shaped exhaust pipe which is spaced apart, on a side of the filter body, from a L-shaped bending portion of the L-shaped exhaust pipe, and the upstream-side exhaust-gas takeout portion of the pressure-difference detector is provided at the step portion of the L-shaped exhaust pipe.

According to this embodiment, while the exhaust gas flows along the outer-periphery side wall of the L-shaped bending of the L-shaped exhaust pipe, the flow of the exhaust gas becomes mild (calm) at a position near the outward-recessed step portion of the outer-periphery side wall. Thus, since the upstream-side exhaust-gas takeout portion is provided at the step portion where the exhaust-gas flow becomes mild (calm), the exhaust gas for pressure-difference detection taken out from each exhaust-gas takeout port is not influenced greatly by the dynamic pressure of the exhaust-gas flow.

In another embodiment of the present invention, a catalyst to purify the exhaust gas is connected to an upstream-side portion of the L-shaped exhaust pipe, and a downstream-side portion of the catalyst is configured to overlap a portion of an upstream-side end face of the filter body, when viewed in an axial direction of the particulate filter.

According to this embodiment, since the distance between an upstream end of the catalyst and a downstream end of the particulate filter can be shortened, the exhaust device can be properly compact, and also the exhaust gas can be made to flow into the particulate filter in a state where the temperature of the exhaust gas does not decrease very much, so that regeneration of the filter (PM burning removal) can be properly attained.

In another embodiment of the present invention, the particulate filter is disposed laterally such that the exhaust gas passes through the particulate filter in a lateral direction, an L-shaped exhaust pipe which is connected to an upstream side, in the exhaust-gas flow direction, of the filter case and configured to be bent in a L shape is provided, the upstream-side exhaust-gas takeout portion and the downstream-side exhaust-gas takeout portion of the pressure-difference detector are respectively provided at a lower portion of the L-shaped exhaust pipe and a lower portion of the downstream-side end portion of the filter case, and the pressure-difference detection portion of the pressure-difference detector is provided around an upper side of the particulate filter.

According to this embodiment, the workability of the pressure-difference detection portion can be improved by providing the pressure-difference detection portion at a position around the upper side of the particulate filter.

In another embodiment of the present invention, the exhaust device further comprises an EGR-gas takeout pipe connected to the EGR-gas takeout port and provided to pass beside the particulate filter which corresponds to an outer-periphery side of the L-shaped bending of the L-shaped exhaust pipe, an EGR-pipe support member provided beside the particulate filter and supporting the EGR-gas takeout pipe, an upstream-side exhaust-gas takeout pipe connecting the upstream-side exhaust-gas takeout portion and the pressure-difference detection portion, and a takeout-pipe support member fixed to the EGR-gas takeout pipe and supporting the upstream-side exhaust-gas takeout pipe.

According to this embodiment, the upstream-side exhaust-gas takeout pipe is supported by the EGR-pipe support member via the takeout-pipe support member and the EGR-gas takeout pipe. By a support structure of the upstream-side exhaust-gas takeout pipe which uses this EGR-gas takeout pipe, the exhaust device can be made properly compact and the layout of the exhaust device can be improved.

Other features, aspects, and advantages of the present invention will become apparent from the following descriptions which refer to the accompanying drawings.

DETAILED DESCRIPTION OF THE INVENTION

Figure 1:
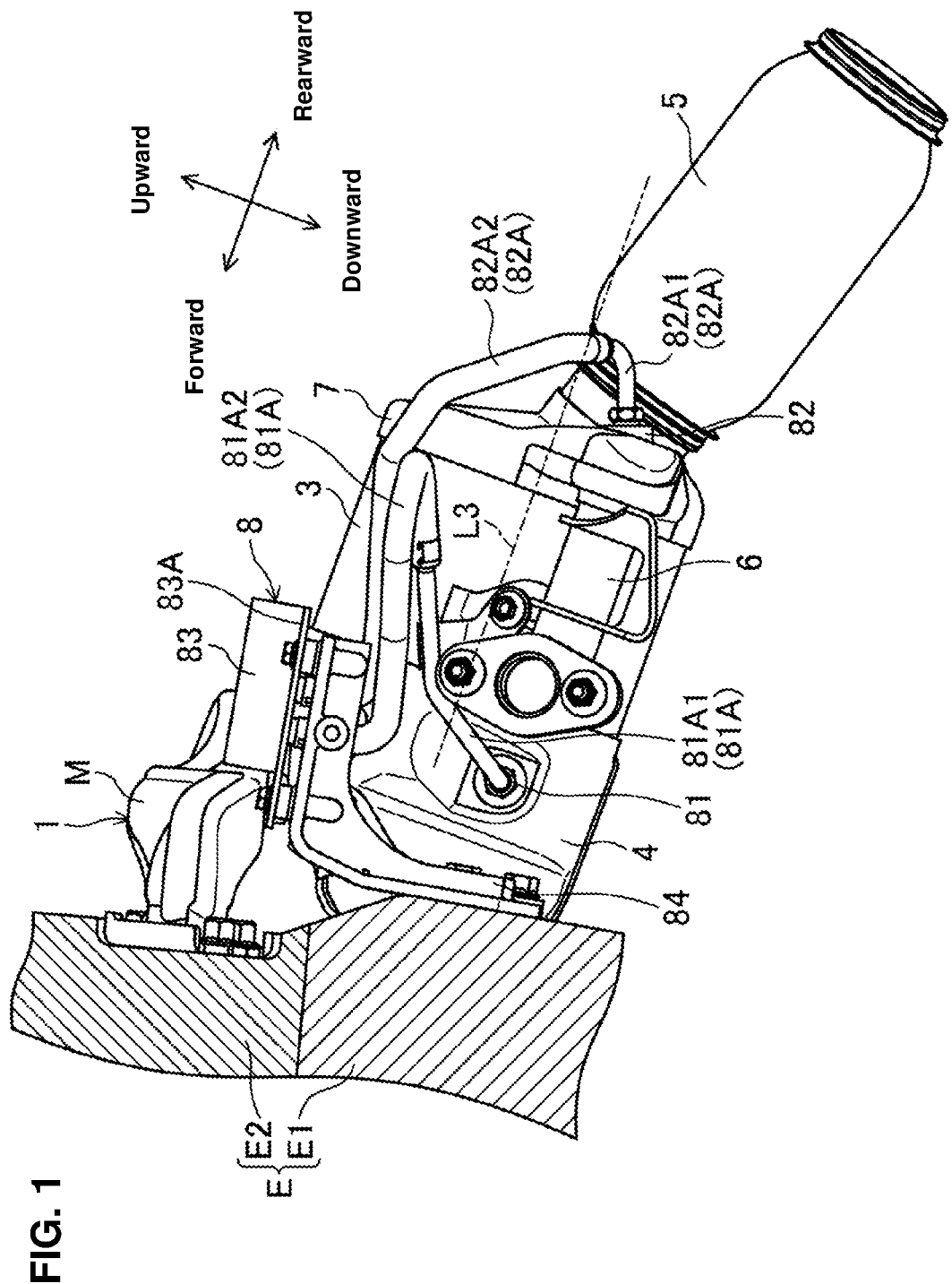
FIG. 1 is a side view schematically showing a state where an exhaust-gas purifying device according to a first embodiment is installed to an engine.

Hereafter, embodiments of the present invention will be described specifically referring to the drawings. The following descriptions about the preferred embodiments exemplify the present invention substantially, which are not to limit applications or usages of the present invention at all.

Embodiment 1

<Engine>

An engine, to which an exhaust device 1 according to a first embodiment is applied, is an in-line four-cylinder gasoline engine (in-line multi-cylinder engine) which is installed to an automotive vehicle. The engine is disposed laterally at a front portion of a FF vehicle.

Herein, the present invention is applicable not only to this four-cylinder gasoline engine but to any other multi-cylinder engine or a diesel engine. Further, the present exhaust device 1 is applicable not only to the FF vehicle but to any other layout-type vehicles, such as a RR vehicle or a 4WD vehicle, including a motorcycle.

The engine has an engine body E which comprises a cylinder block E1 and a cylinder head E2 as shown in FIG. 1. While detailed illustrations are omitted here, first through fourth cylinders which are formed by the cylinder block E1 and the cylinder head E2 are arranged in line in a direction vertical to a paper surface. A combustion chamber of each cylinder is formed by a cylinder bore (not illustrated) of the cylinder block E1, a piston (not illustrated) which is arranged inside the cylinder bore, and the cylinder head E2.

Four exhaust ports (not illustrated) which are respectively connected to the four combustion chambers are formed at the cylinder head E2. Exhaust gas which is generated inside the combustion chambers is discharged to the outside of the vehicle through an exhaust path including these exhaust ports.

<Exhaust Path>

Figure 2:
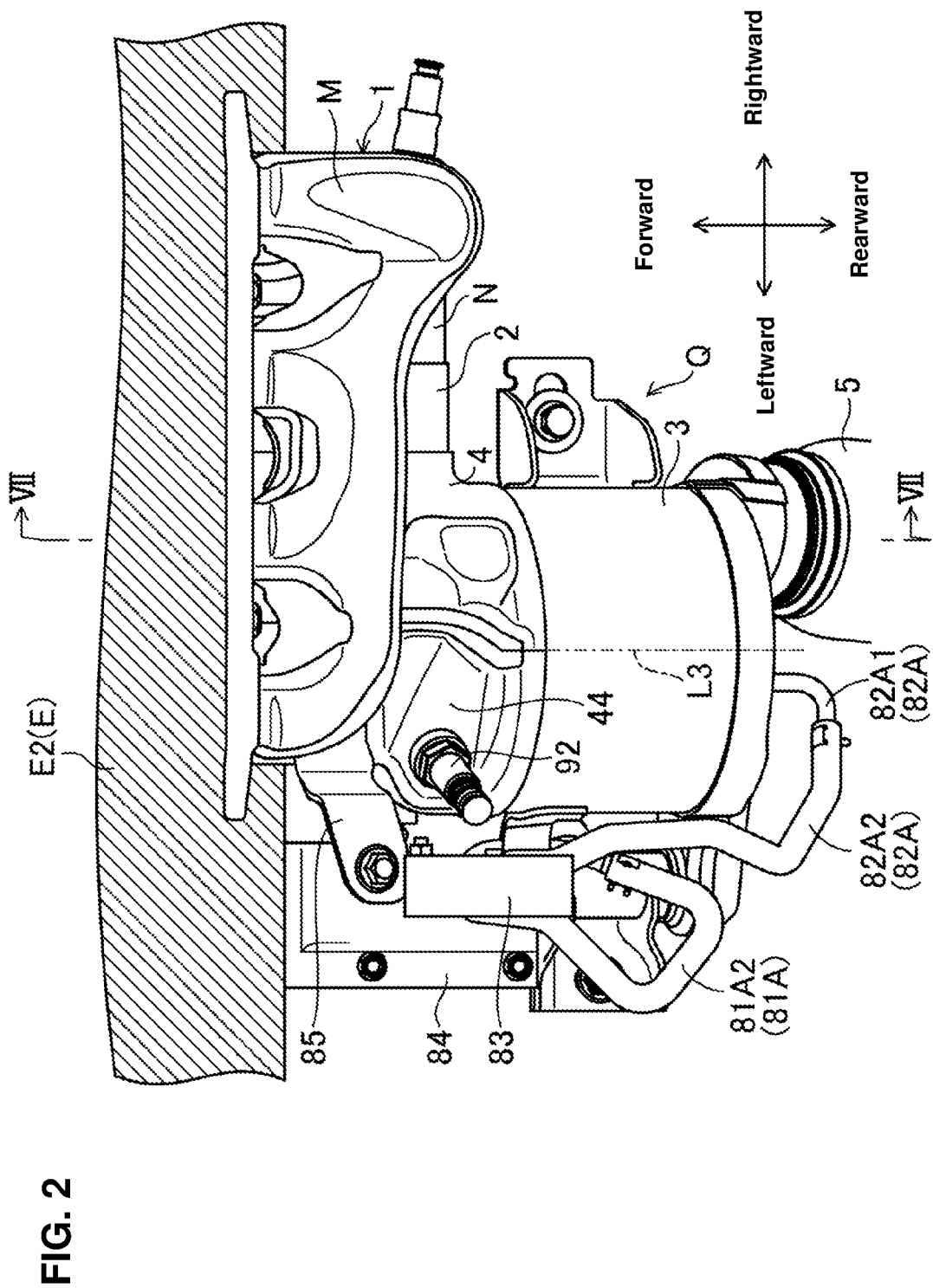
FIG. 2 is a schematic plan view of FIG. 1.

As shown in FIGS. 1 and 2, the exhaust device 1 according to the present embodiment is connected to the above-described exhaust ports, and a downstream-side exhaust system (not illustrated) which is continuous to the vehicle outside is connected to a downstream side of the exhaust device 1. Thus, an exhaust path of the engine comprises the above-described exhaust ports, the exhaust device 1, and the downstream-side exhaust system.

<Exhaust Device>

The exhaust device 1 according to the present embodiment comprises, as shown in FIGS. 1 and 2, an exhaust manifold M which is connected to the four exhaust ports of the engine body E and an exhaust-gas purifying device Q which is connected to a downstream-end outlet M7 of the exhaust manifold M via a connection portion N.

<Exhaust Manifold and Connection Portion>

Figure 4:
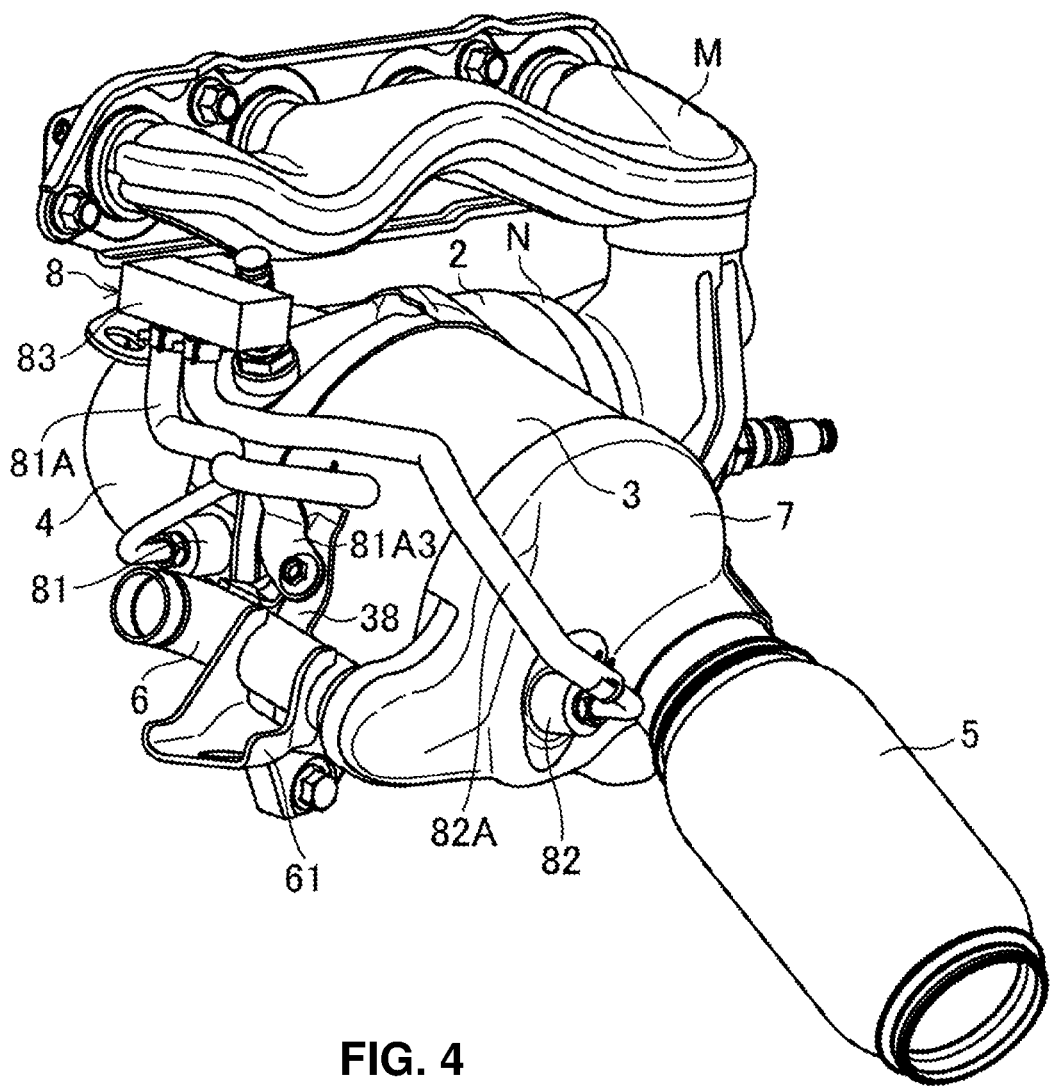
FIG. 4 is a perspective view of the exhaust-gas purifying device of FIG. 3, when viewed from an upper-left rearward side.
Figure 5:
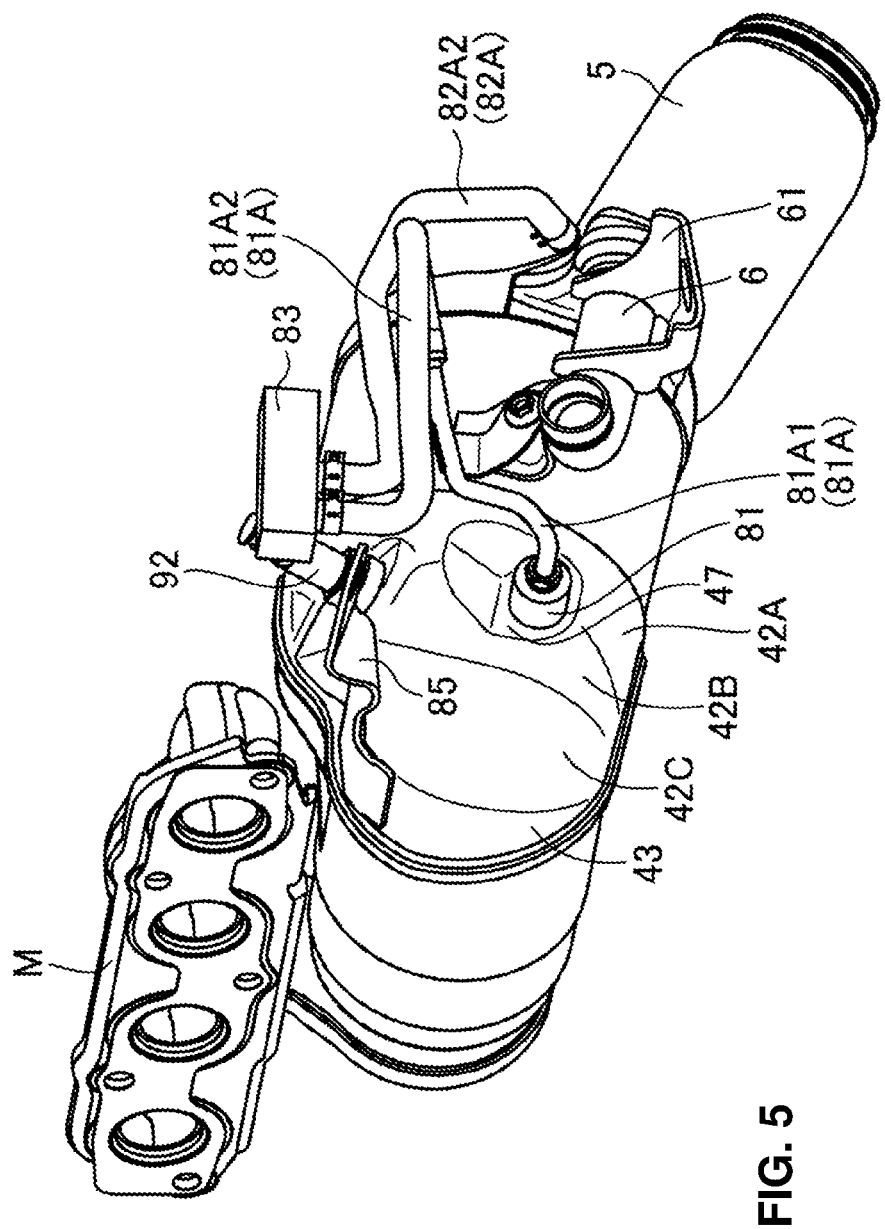
FIG. 5 is a perspective view of the exhaust-gas purifying device of FIG. 3, when viewed from a left forward side.

The exhaust gas which is discharged from four combustion chambers of the engine through the exhaust ports is supplied from the exhaust manifold M to the exhaust-gas purifying device Q via the connection portion N. As shown in FIGS. 2 and 4, respective independent exhaust pipes which are connected to the four exhaust ports and a collective pipe which is arranged on one end side in a cylinder row direction are provided. This collective pipe, to which the four independent exhaust pipes are connected, extends downward.

The connection portion N is a tube-shaped member which introduces the exhaust gas from the collective pipe of the exhaust manifold M into the exhaust-gas purifying device Q.

<Direction>

A "vertical direction" and a "longitudinal direction" which are used in the present description are, as shown in FIG. 1, defined based on the directions where the cylinder head E2 is positioned at an upward side of the engine body E, the cylinder block E1 is positioned at a downward side of the engine body E, and the exhaust manifold M is positioned on a rearward side of the engine body E. Further, a "lateral direction" means, as shown in FIG. 2, a direction of a cylinder row of the engine body E, in other words, a direction vertical to the paper surface of FIG. 1, where a near side means a leftward side and a far side means a rightward side. Moreover, an "upstream" and a "downstream" may mean respectively an "upstream side in the flowing direction of the exhaust-gas discharged from the combustion chamber through the exhaust port" and a "downstream side in the flowing direction of the exhaust-gas discharged from the combustion chamber through the exhaust port."

Herein, in the present embodiment, a "longitudinal direction" is parallel to a center axis L3 of a gasoline particulate filter 3 (hereafter, referred to as "GPF 3") as a particulate filter (hereafter, referred to as "PF") which will be described later, as shown in FIG. 1.

<Exhaust-Gas Purifying Device>

Figure 6:
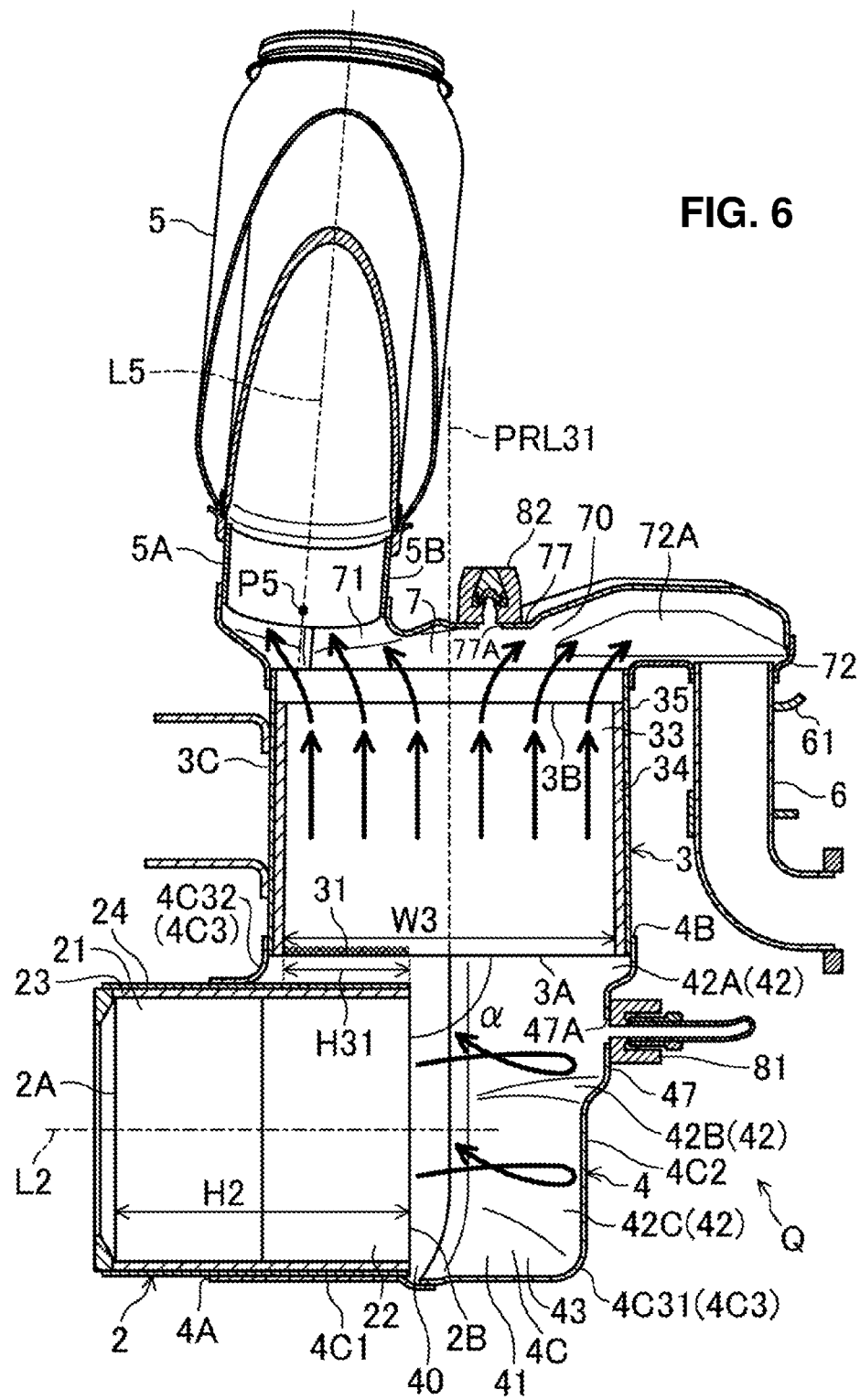
FIG. 6 is a sectional view taken along line VI-VI of FIG. 3.

The exhaust-gas purifying device Q comprises, as shown in FIG. 6, a three-way catalyst 2 which is connected to the outlet of the connection portion N, a GPF (gasoline particulate filter) 3 which is arranged on the downward side of the three-way catalyst 2, and an L-shaped exhaust pipe 4 which interconnects the three-way catalyst 2 and the GPF 3.

<Three-Way Catalyst>

The three-way catalyst 2 is a catalyst for purifying hydrocarbon HC, carbon monoxide CO, and nitrogen oxide NOx contained in the exhaust gas. While specific descriptions are omitted here, the three-way catalyst 2 is made by coating a catalyst component which is formed by carrying noble metal, such as Pt, Pd or Rh, to a metal-oxide made support onto a honeycomb carrier. The three-way catalyst 2 is not to be limited to this in particular, but any known type is applicable.

As shown in FIG. 6, the three-way catalyst 2 is a cylinder-shaped catalyst having a center axis L2. The shape of the three-way catalyst 2 is not limited in particular, but the cylindrical shape is preferable in arranging it in the exhaust path and providing uniform exhaust-gas flowing. A shape of a cross section of the three-way catalyst 2 which is vertical to the center axis L2 is not limited in particular, but any shape, such as a complete round shape, an oval shape, a rectangular shape, or a polygonal shape, is applicable. However, the complete round shape or the oval shape may be preferable in providing the uniform exhaust-gas flowing and reducing a manufacturing cost.

As shown in FIG. 6, a catalyst body of the three-way catalyst 2 which performs purification of the exhaust gas includes an upstream-side end face 2A and a downstream-side end face 2B. The upstream-side end face 2A of the catalyst body and the downstream-side end face 2B of the catalyst body will be sometimes referred to as the upstream-side end face 2A of the three-way catalyst 2 and the downstream-side end face 2B of the three-way catalyst 2 for convenience sake. The both end faces 2A, 2B are of a circular shape having the same diameter.

The three-way catalyst 2 has a two-step structure which comprises a front stage part 21 which is arranged on the upstream side and a rear stage part 22 which is arranged on the downstream side as the catalyst body. The front stage part 21 is a three-way catalyst which is excellent in low temperature activity for purifying the low-temperature exhaust gas during a low-load engine operation of the engine body E. The rear stage part 22 is a three-way catalyst which is excellent in high temperature activity for purifying the high-temperature exhaust gas during a high-load engine operation. While the catalyst 2 is the two-step structure comprising the front stage part 21 and the rear stage part 22 according to the present embodiment, any type of catalyst structure, such as single catalyst structure or a three or more split structure, is applicable.

Further, the three-way catalyst 2 comprises a mat 23 which covers over an outer periphery of the front stage part 21 and the rear stage part 22 as the catalyst body and a cylindrical case 24 which covers over an outer periphery of the mat 23.

The exhaust-gas temperature is about 400° in a light-load engine operation, whereas it is about 800° in a heavy-load engine operation. Accordingly, the three-way catalyst 2 is always disposed to the high-temperature exhaust gas which has passed through the three-way catalyst 2, so that there is a concern that the three-way catalyst 2 may deteriorate because of heat damage.

The mat 23 stably holds the front stage part 21 and the rear stage part 22 as the catalyst body even under an environment where the catalyst body is exposed to the high-temperature exhaust gas, and this mat 23 is made of material having highly heat resistant properties and heat retaining properties, such as ceramic.

The case 24 holds the catalyst body (the front stage part 21 and the rear stage part 22) and the mat 23, and this case 24 is made of metal, such as stainless steel or iron. Herein, any other known material can be applied to the mat 23 or the case 24.

<GPF>

As shown in FIG. 6, the GPF 3 is arranged on the downstream side of the three-way catalyst 2, which comprises a filter body (purifying device body) 33 for trapping particulate matters (hereafter, referred to as "PM") contained in the exhaust gas passing through the three-way catalyst 2. While specific descriptions are omitted here, the filter body 33 is made by applying sealing to the honeycomb carrier or the like and adding the filter performance, for example, or it may have a catalyst coat for promoting burning of the trapped PM. When the PM contained in the exhaust gas are trapped at a portioning wall of the filter 33 and the PM accumulates, a post injection in which fuel for increasing the temperature of the filter body 33 is injected into a combustion chamber in an expansion stroke of the engine is conducted after a main fuel injection in which fuel is injected into the combustion chamber for obtaining a power, for example, thereby burning and removing the PM accumulating at the filter body 33. The filter body 33 is not limited to the above-described structure, but any known structure is applicable.

Figure 3:
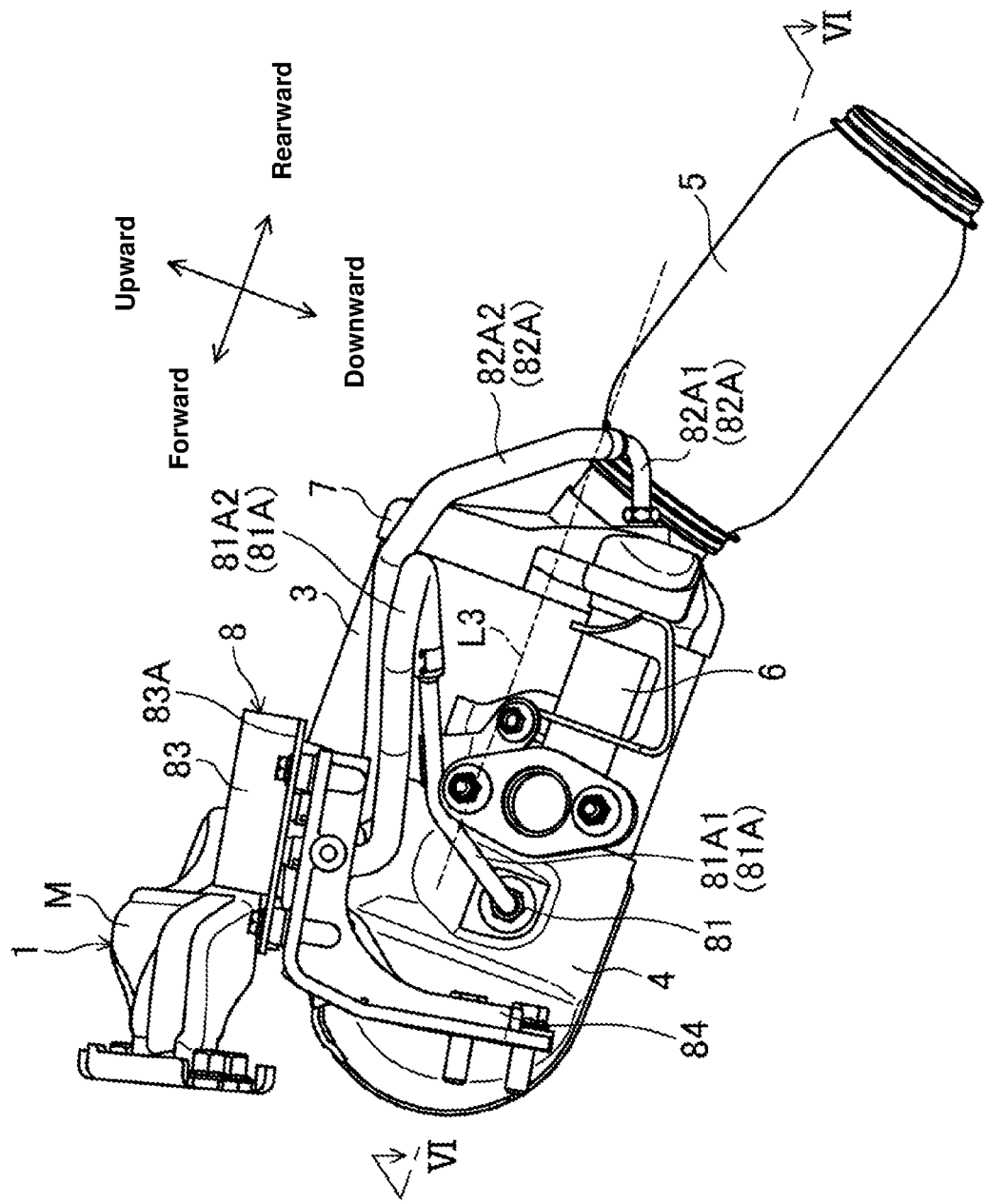
FIG. 3 is a side view showing the exhaust-gas purifying device of FIG. 1.

As shown in FIGS. 1-3, the filter body 33 is a cylinder-shaped member having a center axis L3. The shape of the filter body 33 is not limited in particular, but the cylindrical shape is preferable in easily arranging the filter body 33 in the exhaust path and providing uniform exhaust-gas flowing. A shape of a cross section of the filter body 33 which is vertical to the center axis L3 is not limited in particular, but any shape, such as a complete round shape, an oval shape, a rectangular shape, or a polygonal shape, is applicable. However, the complete round shape or the oval shape are preferable in providing the uniform exhaust-gas flowing and reducing a manufacturing cost.

As shown in FIG. 6, the filter body 33 of the GPF 3 comprises an upstream-side end face 3A and a downstream-side end face 3B. The upstream-side end face 3A of the filter body 33 and the downstream-side end face 3B of the filter body 33 will be sometimes referred to as the upstream-side end face 3A of the GPF 3 and the downstream-side end face 3B of the GPF 3 for convenience sake. The both end faces 3A, 3B are of a circular shape having the same diameter.

Similarly to the three-way catalyst 2, the GPF 3 comprises the filter body 33, a mat 34 which covers a whole part of an outer periphery of the filter body 33, a tube-shaped case 35 which covers a whole part of an outer periphery of the mat 34, and a downstream-side cover 7 which covers the downstream-side end face 3B of the filter body 33 with a gap space. The tube-shaped case 35 and the downstream-side cover 7 constitute a filter case which houses the filter body 33. The mat 34 and the tube-shaped case 35 are used for the same purpose as the mat 23 and the case 24 of the three-way catalyst 2 described above, and the same structure is applicable.

<L-Shaped Exhaust Pipe>

The L-shaped exhaust pipe 4 is a tube-shaped member which is formed in an L-shaped bent shape and connects the three-way catalyst 2 and the GPF 3, which forms a part of the exhaust path.

As shown in FIG. 6, the L-shaped exhaust pipe 4 comprises an upstream-side opening 4A, a downstream-side opening 4B, and a bending portion 4C which is provided between the both openings 4A, 4B. The bending portion 4C comprises a first tube-shaped portion 4C1 which extends in the cylinder row direction (downstream side) from the upstream-side opening 4A, a second tube-shaped portion 4C2 which extends toward the engine body from the downstream-side opening 4B, and a bending portion 4C3 which connects the first tube-shaped portion 4C1 and the second tube-shaped portion 4C2. The bending portion 4C3 comprises an outer-peripheral-side bending portion 4C31 which is positioned on an outer-peripheral side of L-shaped bending and an inner-peripheral-side bending portion 4C32 which is positioned on an inner-peripheral side of the L-shaped bending.

As shown in FIG. 6, a downstream portion of the three-way catalyst 2 is inserted into the L-shaped exhaust pipe 4 through the upstream-side opening 4A. Meanwhile, an upstream end portion of the GPF 3 is inserted into the L-shaped exhaust pipe 4 through the downstream-side opening 4B.

—Relative Arrangement of Three-Way Catalyst and GPF—

Figure 7:
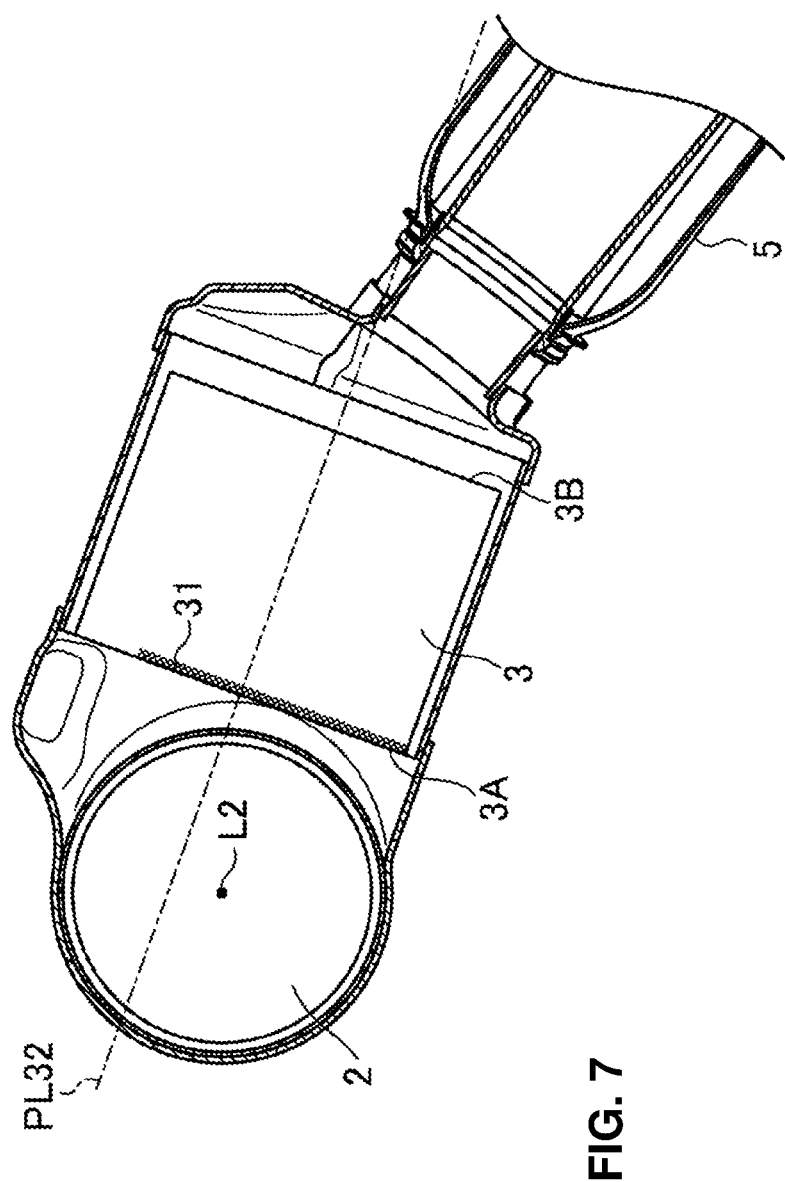
FIG. 7 is a sectional view taken along line VII-VII of FIG. 2.

FIG. 7, which is a sectional view taken along line VII-VII of FIG. 2, shows a cross section of the exhaust-gas purifying device which is vertical to the center axis L2 of the three-way catalyst 2 and passes the GPF 3 and the exhaust-gas discharge pipe 5, when viewed from a leftward side. The cross section shown in FIG. 7 will be referred to as "VII-VII cross section." A line denoted by reference character PL32 in FIG. 7 shows a plane which includes the center axis L3 of the GPF 3 and is parallel to the center axis L2 of the three-way catalyst 2.

As shown in FIG. 7, the position of the center axis L2 of the three-way catalyst 2 is located below the plane PL32, i.e., the center axis L3 of the GPF 3 on the VII-VII cross section. Thereby, the exhaust manifold M can be arranged above the three-way catalyst 2, so that the exhaust device 1 can be provided to be properly compact in the vehicle.

As shown in FIG. 6, the downstream-side end face 2B of the three-way catalyst 2 and the upstream-side end face 3A of the GPF 3 are provided such that a two-face angle α is about 90 degrees at the bending portion 4C. This two-face angle α is not limited to this specific angle value, but in securing the exhaust-gas flowing from the three-way catalyst 2 to the GPF 3 sufficiently, an angle of 60-120 degrees is preferable, an angle of 70-110 degrees is more preferable, and an angle of 80-100 degrees is particularly preferable.

In addition, the three-way catalyst 2 and the GPF 3 are provided such that the downstream portion of the three-way catalyst 2 overlaps a portion of the upstream-side end face 3A of the GPF 3, when viewed in the axial direction of the GPF 3. That is, an overlap portion 31 is formed at the three-way catalyst 2 and the GPF 3.

FIG. 6 is a sectional view taken along line VI-VI of FIG. 3, which shows a cross section which includes the center axis L2 of the three-way catalyst 2 and is parallel to the center axis L3 of the GPF 3, when viewed from the upward side. The cross section shown in FIG. 6 will be referred to as "VI-VI cross section" (cross section). As shown in FIG. 6, a length H31 of the side face of the three-way catalyst 2 which forms the overlap portion 31 relative to a whole length H2 of the three-say catalyst 2 is preferably 10 to 50% in the V-V cross section for arranging the tree-way catalyst 2 and the GPF 3 compactly and uniformizing the exhaust-gas flow in the GPF 3.

Further, the length H31 of the side face of the three-way catalyst 2 relative to a width W3 of the GPF 3 is preferably 10 to 50% in the VI-VI cross section of FIG. 6 for arranging the tree-way catalyst 2 and the GPF 3 compactly and uniformizing the exhaust-gas flow in the GPF 3.

Thus, by providing the overlap portion 31 of the three-way catalyst 2 and the GPF 3 in a case where the three-way catalyst 2 and the GPF 3 are arranged mutually in the lateral direction, the distance between a downstream end of the exhaust manifold M and the GPF 3 can be made properly short. Further, by controlling (limiting) an area where the overlap portion 31 is provided within the above-described range, the exhaust device 1 can be properly compact and also the use efficiency of the GPF 3, in particular a portion of the GPF 3 which is positioned behind the overlap portion 31, can be properly improved.

—First Pipe Member and Second Pipe Member—

Figure 8:
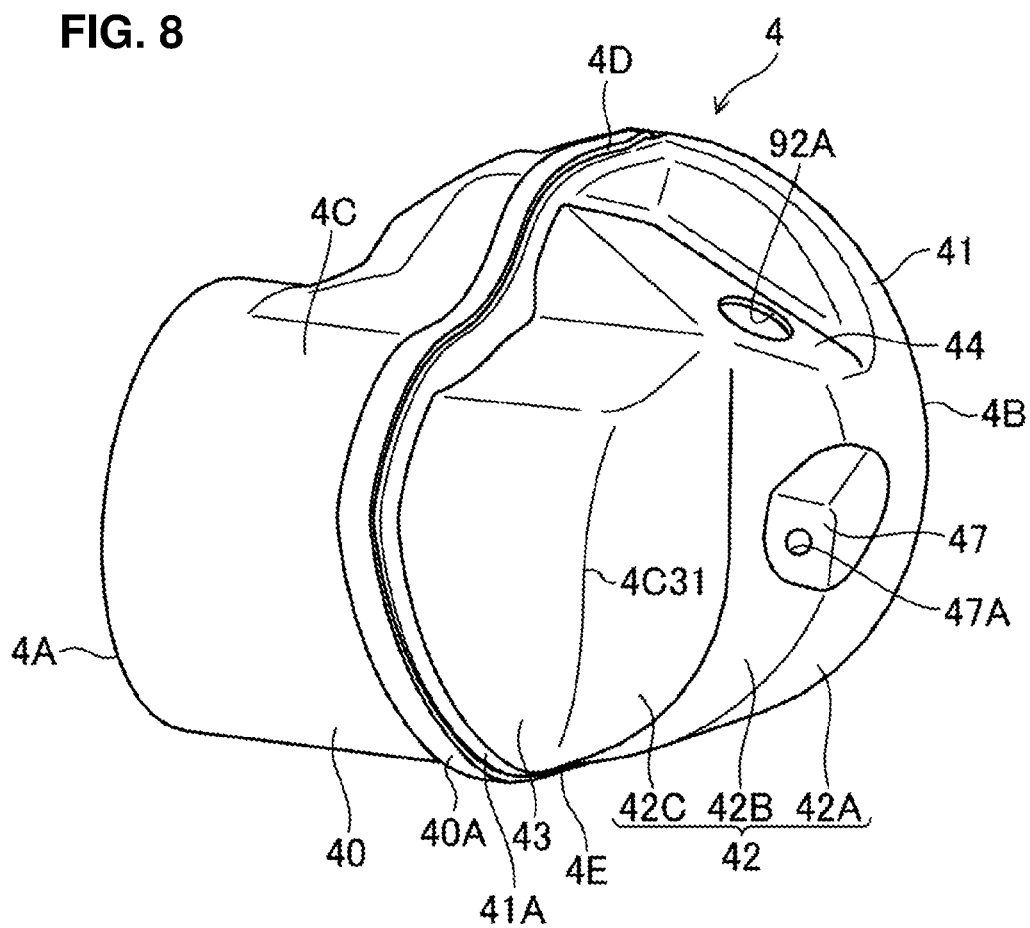
FIG. 8 is a perspective view of a connecting pipe, when viewed from an upper-left forward side.

The L-shaped exhaust pipe 4 comprises, as shown in FIGS. 6 and 8, a first pipe member 40 and a second pipe member 41. That is, the L-shaped exhaust pipe 4 comprises, as shown in FIG. 6, the first pipe member 40 and the second pipe member 41 which are joined together, providing a joint line thereof at a substantially vertical face which passes at a position around the center of the downstream-side opening 4B. This joint line passes at a position near and on the downstream side of the downstream-side end face 2B of the three-way catalyst 2.

The first pipe member 40 constitutes the upstream-side opening 4A, and the downstream-side opening 4B is constituted by joining of the first pipe member 40 and the second pipe member 41. Specifically, the first pipe member 40 constitutes the upstream-side opening 4A, and constitutes a part of the downstream-side opening 4B and a part of the bending portion 4C, including the inner-peripheral-side bending portion 4C32. The second pipe member 41 constitutes the rest part of the downstream-side opening 4B and the rest part of the bending portion 4C, including the outer-peripheral-side bending portion 4C31.

Since the L-shaped exhaust pipe 4 is constituted by the first pipe member 40 and the second pipe member 41, the L-shaped exhaust pipe 4 is easily formed (made). Further, since the inner-peripheral-side bending portion 4C32 which has an easy stress-concentration and has a small curvature radius is constituted by the first pipe member 40, that is, the joint line is provided, avoiding a portion where the stress is easily concentrated, the durability of the L-shaped exhaust pipe 4 can be properly secured.

In the present description, respective points which are positioned at an uppermost portion and a lowermost portion of the L-shaped exhaust pipe 4 in a state where the exhaust device 1 including the L-shaped exhaust pipe 4 shown in FIG. 8 is assembled to the engine body E are referred to as a top portion 4D and a bottom portion 4E. In the present embodiment, the top portion 4D and the bottom portion 4E are positioned near a joint portion of the first pipe member 40 and the second pipe member 41.

—First Wall Portion and Second Wall Portion—

The L-shaped exhaust pipe 4 comprises, as shown in FIGS. 6 and 8, a first wall portion 42 and a second wall portion 43 which guides the exhaust gas passing through the three-way catalyst 2 to the GPF 3. As shown in FIG. 6, the first wall portion 42 faces the downstream-side end face 2B of the three-way catalyst 2, and the second wall portion 43 faces the upstream-side end face 3A of the GPF 3 and constitutes the outer-peripheral-side bending portion 4C31.

The first wall portion 42 and the second wall portion 43 are provided at the second pipe member 41 which constitutes the L-shaped exhaust pipe 4. Accordingly, a smooth wall face without any joint line can be formed by the first wall portion 42 and the second wall portion 43, so that turbulence of the exhaust-gas flow can be properly suppressed.

The first wall portion 42 which faces the downstream-side end face 2B of the three-way catalyst 2 comprises, as shown in FIGS. 6 and 8, an upstream-side wall portion 42C which constitutes the downstream-side opening 4B, a downstream-side wall portion 42A which is continuous to the outer-peripheral-side bending portion 4C31, and a slant wall portion 42B which smoothly connects the both wall portions 42A, 42C. The upstream-side wall portion 42C protrudes toward the three-way catalyst 2 beyond the downstream-side wall portion 42A. In other words, the downstream-side wall portion 42A is configured to be a step portion which is recessed outward. These wall portions 42A, 42B, 42C constitute a part of the second tube-shaped portion 4C2.

Since the upstream-side wall portion 42C protrudes toward the three-way catalyst 2 beyond the downstream-side wall portion 42A, the exhaust gas which has passed through the three-way catalyst 2 and reached the upstream-side wall portion 42C tends to flow toward the central side of the upstream-side end face 3A of the GPF 3 as shown in FIG. 6. That is, it is prevented that the exhaust-gas flow concentrates on a portion of the GPF 3 which corresponds to an outer-peripheral side of the L-shaped bending of the L-shaped exhaust pipe 4, so that the exhaust-gas flow toward the portion (shade portion) positioned behind the overlap portion 31 of the GPF 3 is induced.

As shown in FIGS. 6, and 8, a seat portion 47 where an upstream-side exhaust-gas takeout portion 81 of a pressure-difference detector 8, which is shown in FIG. 2 and will be described later, is disposed is provided at the downstream-side wall portion 42A which is recessed outward further than the upstream-side wall portion 42C, and an exhaust-gas takeout port 47A for pressure detection is formed at the seat portion 47.

As shown in FIG. 8, a seat portion 44 is provided at the second pipe member 41 on the side of the top portion 4D of the L-shaped exhaust pipe 4. At this seat portion 44 is provided a NOx sensor 92 (detector) shown in FIG. 2, for example. An attachment port 92A for attaching the NOx sensor 92 is provided at the seat portion 44.

As shown by solid-line arrows in FIG. 6, the exhaust gas passing through the three-way catalyst 2 flows, swirling upward along a wall face of the first wall portion 42, and then flows into the GPF 3 from the L-shaped exhaust pipe 4. Since the downstream-side wall portion 42A of the L-shaped exhaust pipe 4 is spaced apart from the three-way catalyst 2 further than the upstream-side wall portion 42C, a flow speed of the exhaust gas positioned near the downstream-side wall portion 42A is low. Accordingly, the pressure of the exhaust gas on the upstream side of the GPF 3 can be stably detected without receiving influence of the exhaust-gas flow greatly because the exhaust gas is taken out from the upstream-side exhaust-gas takeout portion 81 disposed at the seat portion 47 of the downstream-side wall portion 42A.

Further, since the exhaust gas passing through the three-way catalyst 2 does not directly contact a position around the seat portion 44 where the NOx sensor 92 of the top portion 4D of the L-shaped exhaust pipe 4 is provided, the NOx concentration in the exhaust gas can be stably detected, without being influenced by the exhaust-gas flow greatly.

Herein, any control device of various sensors or the like other than the upstream-side exhaust-gas takeout portion 81 or the NOx sensor 92 may be disposed at the seat portions 44, 47. Thereby, the stable detection accuracy can be secured.

Herein, while the seat portions 44, 47 are formed in a flat shape, these may be formed in a curved-face shape.

<Downstream-Side End Portion of GPF>

As shown in FIGS. 6 and 7, at a downstream-side end portion 7 of the GPF 3 are provided an exhaust-gas discharge port 71 which introduces the exhaust gas passing through the GPF 3 into the exhaust-gas discharge pipe 5 and an EGR-gas takeout port 70 for supplying a part of the exhaust gas to the engine intake system as the EGR gas. An EGR-gas takeout pipe 6 is connected to the EGR-gas takeout port 70 via an EGR-gas introduction portion 72A.

<Exhaust-Gas Discharge Pipe>

The exhaust-gas discharge pipe 5 guides the exhaust gas passing through the GPF 3 to a downstream-side exhaust system, and reserves and drains water which is accompanied by the purification of the exhaust gas by means of the three-way catalyst 2 and the GPF 3.

A line denoted by a reference character PRL31 in FIG. 6 is a projection line of the center axis L3 on the VI-VI cross section. Further, a line denoted by a reference character L5 shows a center axis of the exhaust-gas discharge pipe 5. A point denoted by a reference character P5 is the one on the center axis L5 of the exhaust-gas discharge pipe 5 and shows a center of an inlet of the exhaust-gas discharge pipe 5.

As shown in FIG. 6, a center of the exhaust-gas discharge port 71 is offset, on the side of the three-way catalyst 2, from the projection line PRL31 of the center axis L3 of the GPF 3. Whereas, the center P5 of the inlet of the exhaust-gas discharge pipe 5 is also offset, on the side of the three-way catalyst 2, from the projection line PRL31 of the center axis L3 of the GPF 3.

Figure 9:
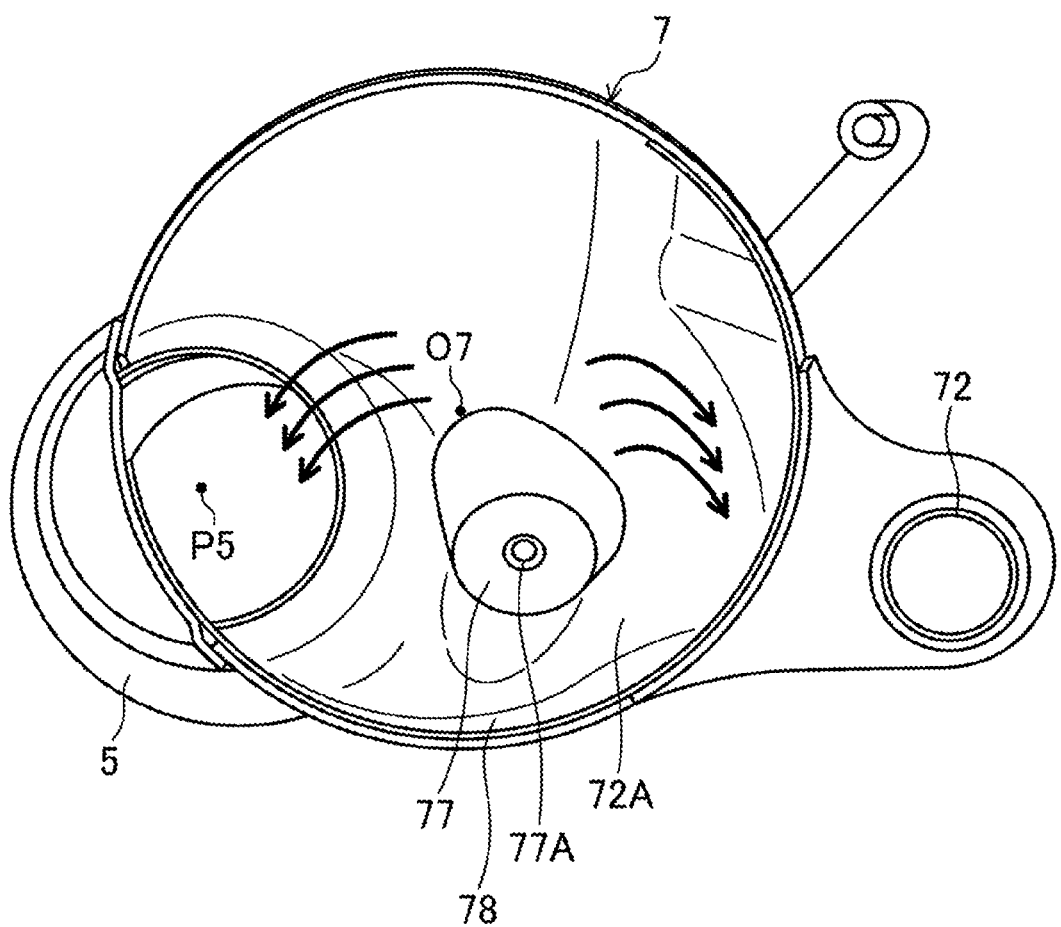
FIG. 9 is a view of a GPF terminal end portion connecting pipe, when viewed from a forward side.

According to this structure, as shown in FIGS. 6 and 9, there occurs a flow of the exhaust gas flowing into the GPF 3 which is directed toward the exhaust-gas exhaust pipe 5 as shown by sold-line arrows in FIG. 6. According to this exhaust-gas flow directed toward the exhaust-gas exhaust pipe 5, the amount of the exhaust gas flowing into the portion (shade portion) positioned behind the overlap portion 31 increases. Thereby, the use efficiency of the GPF 3 can be improved.

Herein, the offset quantity of the center P5 of the exhaust-gas discharge pipe 5 can be preferably set so that a right-side face 5A of the exhaust-gas discharge pipe 5, which is positioned on the side of the three-way catalyst 2, is located on the rightward side, i.e., on the side of the three-way catalyst 2, of a GPF side face 3C of the GPF 3, which is positioned on the side of the three-way catalyst 2, on the VI-VI cross section from aspects of improving the use efficiency of the GPF 3 by sufficiently securing the amount of the exhaust gas flowing into the portion positioned behind the overlap portion 31. In this case, it is preferable, from aspects of suppressing an increase of flow resistance around the exhaust-gas discharge pipe 5, that the offset quantity of the exhaust-gas discharge pipe 5 be set so that a left-side face 5B of the exhaust-gas discharge pipe 5 which is positioned on the leftward side is located on the leftward side of the GPF side face 3C of the GPF 3 which is positioned on the side of the three-way catalyst 2 on the VI-VI cross section.

Further, as shown in FIG. 7, the exhaust-gas discharge pipe 5 is arranged below the plane PL32. In other words, as shown in FIG. 9, the center position P5 of the exhaust-gas discharge pipe 5 is arranged below a center position O7 of the downstream-side cover 7. Thus, by positioning the exhaust-gas discharge pipe 5 at a lower level than the GPF 3, the water accompanied by the purification of the exhaust gas by means of the three-way catalyst 2 and the GPF 3 can be effectively reserved and drained in the exhaust-gas discharge pipe 5.

<EGR>

The engine body E is provided with EGR to recirculate a part of the exhaust gas to the intake system of the engine for the purpose of preventing an occurrence of nocking or reducing the amount of nitrogen oxide NOx. The EGR-gas takeout pipe 6 (EGR path) which extends forward passing beside (leftward) the GPF 3 is provided on the downstream side of the GPF 3.

As shown in FIG. 6, a center of the EGR-gas takeout port 70 is offset, on an opposite side to the exhaust-gas discharge port 71, from the projection line PRL31 which corresponds to the center axis L3 of the GPF 3. The EGR-gas takeout pipe 6 is connected to an EGR-gas introduction port 72 of a tip portion of the EGR-gas introduction portion 72A which protrudes toward a side of the GPF 3 (toward an opposite side to an arrangement side of the exhaust-gas discharge pipe 5). The EGR-gas takeout pipe 6 extends from the EGR-gas introduction port 72 toward the engine-body side on the side of the GPF 3, in parallel to the center axis of the GPF 3. The EGR-gas introduction port 72 is arranged below the center position O7 of the downstream-side cover 7 of the GPF 3 as shown in FIG. 9.

Thereby, as shown by solid-line arrows in FIG. 6, the EGR gas can be taken out in an inertia direction of the exhaust gas when the exhaust gas discharged out of the three-way catalyst 2 passes through the L-shaped exhaust pipe 4. Accordingly, the sufficient amount of EGR gas can be secured. Further, the EGR can be taken out, suppressing mutual interference with the exhaust-gas flow toward the exhaust-gas discharge pipe 5. Moreover, the exhaust-gas flow in the GPF 3 can be dispersed laterally and uniformized, so that the use efficiency, function, performance of the GPF 3 can be further improved.

As shown in FIGS. 6 and 9, a seat portion 77 where the downstream-side exhaust-gas takeout port 77A opens is provided at a portion between the exhaust-gas discharge port 71 and the EGR-gas takeout port 70 at the downstream-side cover 7 of the GPF 3, and a downstream-side exhaust-gas takeout portion 82 of the pressure-difference detector 8, which will be described later, is provided at this seat portion 77. The flow of the exhaust gas is branched into a side of the exhaust-gas discharge port 71 and a side of the EGR-gas takeout port 70 around the seat portion 77, where the flow speed of the exhaust gas tends to be slow and uniform. Accordingly, the pressure of the exhaust gas can be detected without receiving influence of the exhaust-gas flow greatly because the exhaust gas is taken out from the downstream-side exhaust-gas takeout portion 82.

Herein, a space portion 78 having a bottom portion which is positioned at a lower level than the EGR-gas takeout port 70 is formed below the seat portion 77. Even if condensed water which has been generated in the EGR path flows reversely, this water stays in the space portion 78, so that it can be prevented that the EGR-gas takeout port 70 and the EGR-gas introduction portion 72A are closed with the condensed water.

<Pressure-Difference Detector>

The pressure-difference detector 8 to detect a pressure difference of the exhaust gas between the upstream side and the downstream side of the filter body 33 of the GPF 3 is provided at the GPF 3 as shown in FIGS. 1-5 and others. The amount of PM accumulating at the GPF 3 is calculated based on the pressure difference detected by the pressure-difference detector 8.

Figure 10:
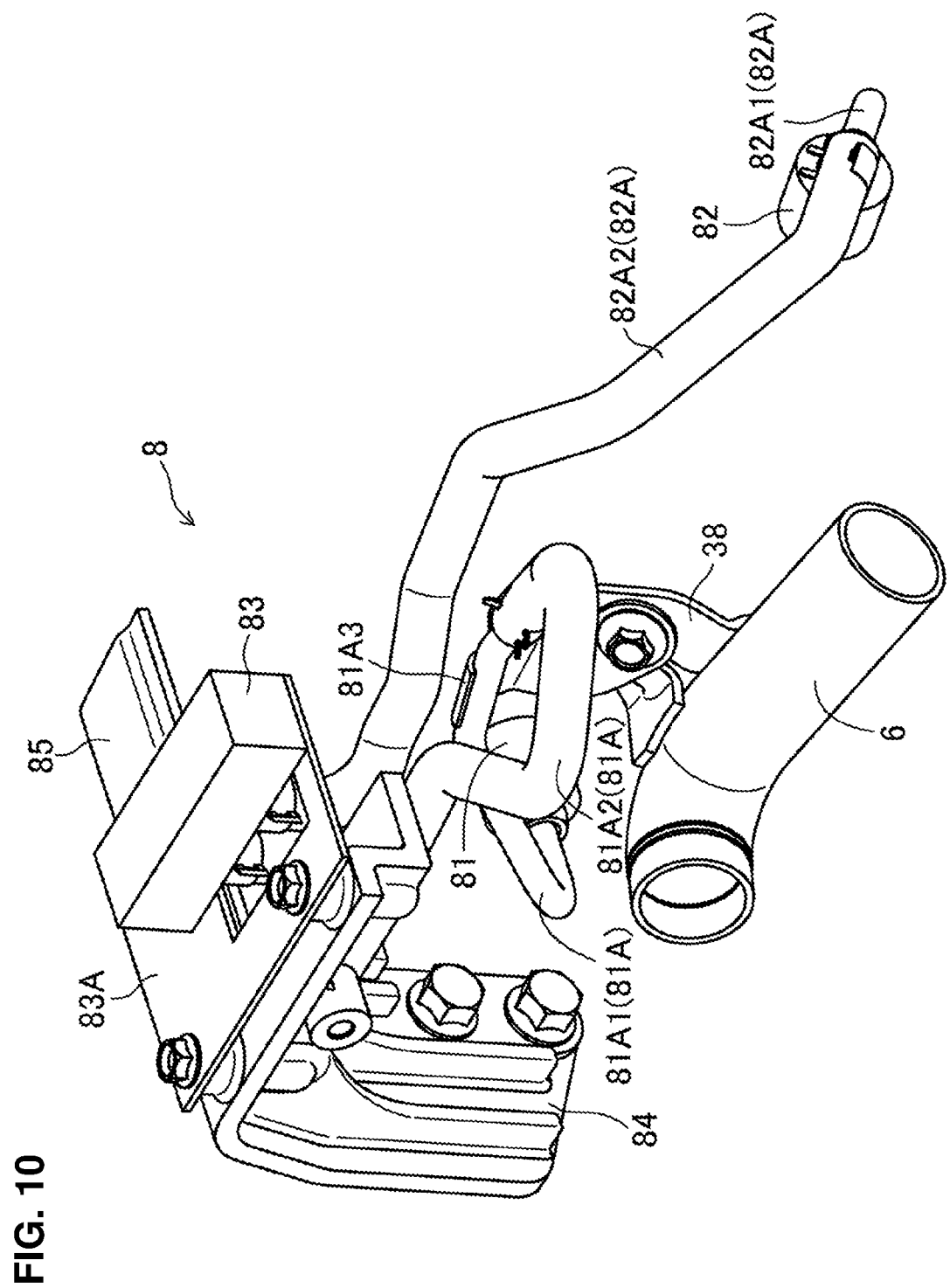
FIG. 10 is a perspective view of a pressure-difference detector, when viewed from the upper-left rearward side.
Figure 11:
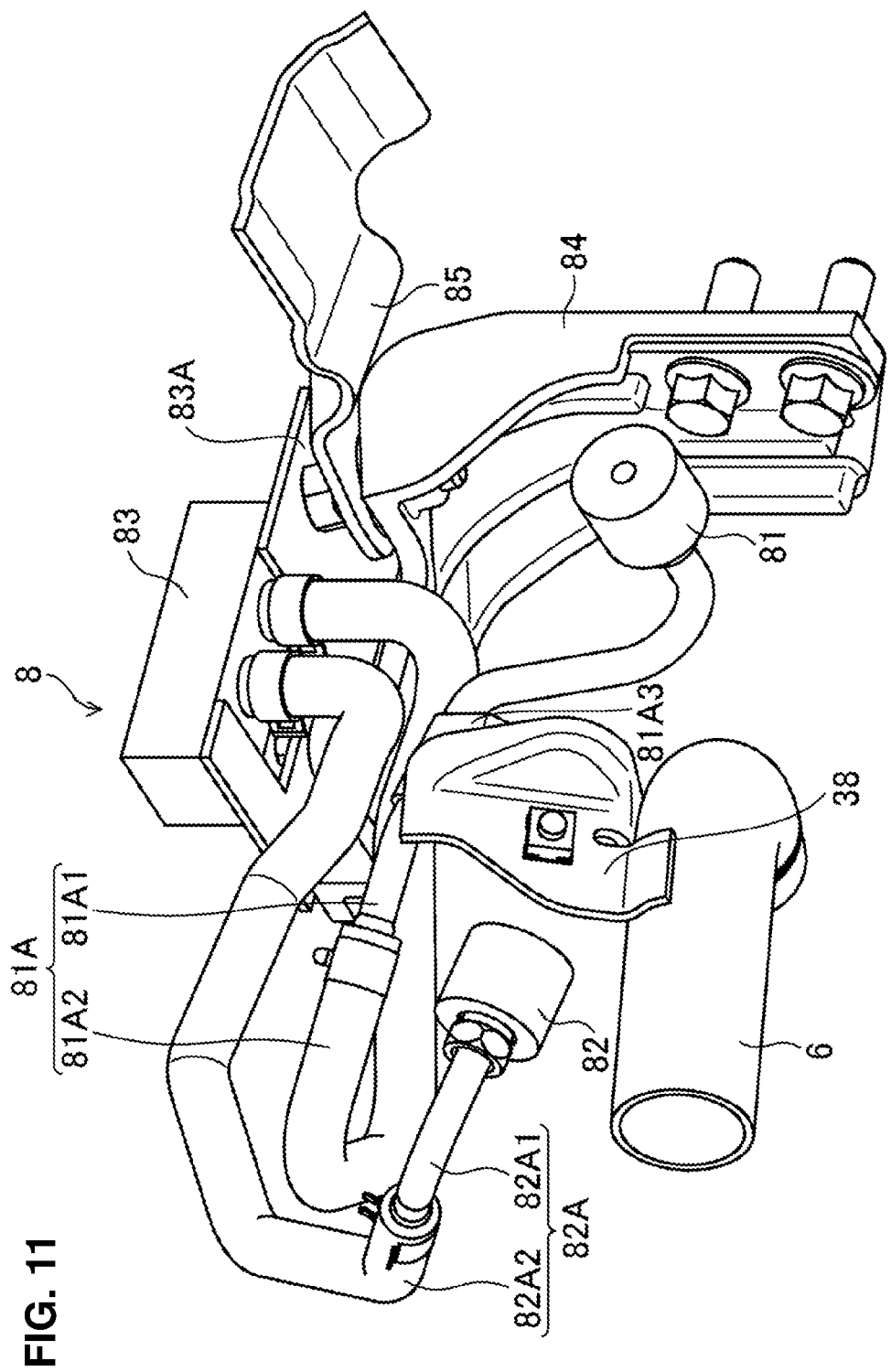
FIG. 11 is a perspective view of the pressure-difference detector, when viewed from a lower-right rearward side.

The pressure-difference detector 8 comprises, as shown in FIGS. 6, 10 and 11, the upstream-side exhaust-gas takeout portion 81 which takes out the exhaust gas positioned on the upstream side of the filter body 33, the downstream-side exhaust-gas takeout portion 82 which takes out the exhaust gas positioned on the downstream side of the filter body 33, and a pressure-difference sensor (pressure-difference detection portion) 83 which detects the pressure difference from the respective pressures of the exhaust gas taken out from the takeout portions 81, 82.

The upstream-side exhaust-gas takeout portion 81 is provided at the seat portion 47 of the L-shaped exhaust pipe 4 as described above. Whereas, the downstream-side exhaust-gas takeout portion 82 is provided at the seat portion 77 of the downstream-side cover 7 of the GPF 3 as described above. The upstream-side exhaust-gas takeout portion 81 and the pressure-difference sensor 83 are connected by an upstream-side exhaust-gas takeout pipe 81A shown in FIGS. 2 and 4. The downstream-side exhaust-gas takeout portion 82 and the pressure-difference sensor 83 are connected by a downstream-side exhaust-gas takeout pipe 82A.

As shown in FIG. 11 and others, the upstream-side exhaust-gas takeout pipe 81A comprises a takeout pipe 81A1 and another takeout pipe 81A2 which is connected to the takeout pipe 81A1. Further, the downstream-side exhaust-gas takeout pipe 82A comprises a takeout pipe 82A1 and another takeout pipe 82A2 which is connected to the takeout pipe 82A1.

As shown in FIGS. 1-3, the pressure-difference sensor 83 is arranged at an upper side beside the GPF 3.

Figure 12:
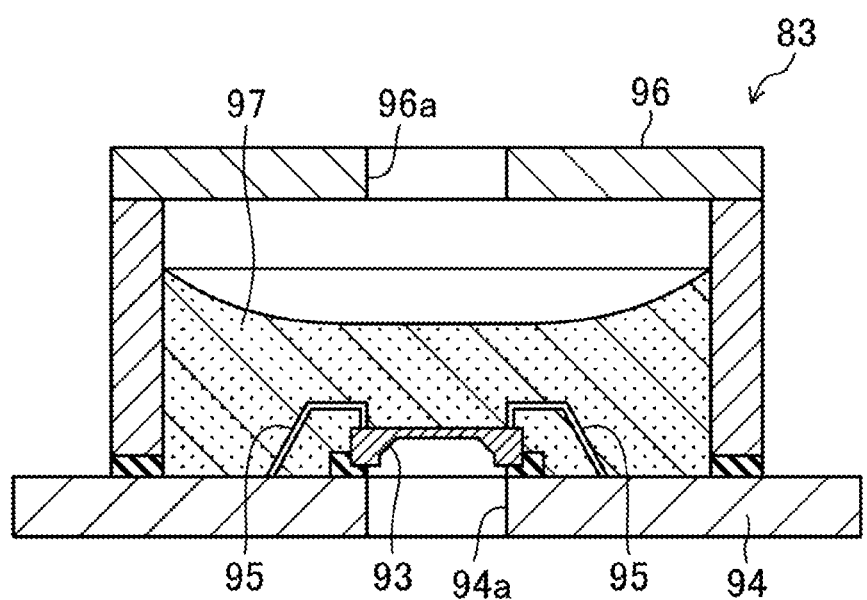
FIG. 12 is a sectional view of a pressure-difference sensor.

As shown in FIG. 12, the pressure-difference sensor 83 comprises a both-face pressure receiving type of diaphragm 93, and a pressure-difference detecting film (not illustrated) with a strain gage is provided at a surface of the diaphragm 93. The diaphragm 93 is fixed to a circuit board 94 by an adhesive agent 95. An upstream-side pressure introduction port 94a which introduces the pressure of the exhaust gas taken out from the upstream-side exhaust-gas takeout portion 81 into a lower-face side of the diaphragm 93 is formed at the circuit board 94. The strain gage of the diaphragm 93 and the circuit board 94 are connected by a bonding wire 95. A cover 96 which covers the diaphragm 93 and the bonding wire 95 is fixed to the circuit board 94 by an adhesive agent. A downstream-side pressure introduction port 96a which introduces the pressure of the exhaust gas taken out from the downstream-side exhaust-gas takeout portion 82 into an upper-face side of the diaphragm 93 is formed at the cover 96. The diaphragm 93 and the bonding wire 95 are covered with a gel-shaped material 97.

The pressure-difference sensor 83 is configured such that the strain gage detects a strain of the diaphragm 93 which is caused by a difference between the exhaust-gas pressures applied to the upper-face side and the lower-face side of the diaphragm 93. That is, the pressure difference is detected as a change of the electric resistance which is caused by deformation of the strain gage.

In FIG. 11, a reference character 85 denotes a first support member which is fixed to the L-shaped exhaust pipe 4, a second support member 84 is fixed to this first support member 85, and the pressure-difference sensor 83 is supported at the second support member 84 via a pressure-difference sensor attaching plate 83A. The second support member 84 is fixed to the cylinder block E1 as shown in FIG. 1. Since the second support member 84 is joined to the cylinder block E1 and the L-shaped exhaust pipe 4, this second support member 84 is commonly used for supporting of the pressure-difference sensor 83 and the L-shaped exhaust pipe 4 by the cylinder block E1.

Herein, illustration of the pressure-difference sensor attaching plate 83A is omitted in FIG. 2.

The upstream-side exhaust-gas takeout portion 81 and the downstream-side exhaust-gas takeout portion 82 are respectively arranged at an upstream-side lower portion and a downstream-side lower portion of the GPF 3 for stabilizing the pressure detection. Meanwhile, the pressure-difference sensor 83 is arranged at an upper side of a side portion of the GPF 3, so that the workability of the pressure-difference sensor 83 is improved. Further, the long takeout pipes 81A1, 82A1 are configured to extend from the upstream-side exhaust-gas takeout portion 81 and the downstream-side exhaust-gas takeout portion 82 and respective lengths of the takeout pipes 81A2, 82A2 which are continuous to these portions 81A1, 82A1 are configured to be long, so that the workability of installing the pressure-difference detector 8 including a pipe-connection work and the like is improved.

Further, the pressure-difference sensor 83 and the upstream-side exhaust-gas takeout portion 81 are arranged on the same side as the EGR-gas takeout pipe 6 relative to the GPF 3. Therefore, the upstream-side exhaust-gas takeout pipe 81A can be also arranged on the same side as the EGR-gas takeout pipe 6.

As shown in FIGS. 3 and 4, the EGR-gas takeout pipe 6 is supported by an engine-related component, such as a transmission, not illustrated, via an EGR-pipe support member 61. As shown in FIGS. 10 and 11, the first support member 38 which supports the GPF 3 is attached to the EGR-gas takeout pipe 6. Further, a takeout-pipe support member 81A3 which supports the upstream-side exhaust-gas takeout pipe 81A is fixed to the first support member 38. Thereby, as shown in FIG. 4, the upstream-side exhaust-gas takeout pipe 81A is also supported by the EGR-pipe support member 61. Thus, the compactness and layout of the device can be improved by supporting the upstream-side exhaust-gas takeout pipe 81A by utilizing the EGR-pipe support member 61.

Other Embodiments

While the exhaust device 1 of the first embodiment is applied to the FF vehicle, the present invention is applicable to a FR vehicle by configuring the exhaust device such that the independent exhaust pipes of the exhaust manifold M which are connected to the four exhaust ports extend rearward and join together and then extend rearward at a central side, in the vehicle width direction, of the engine body E.

While the upstream-side catalyst is the three-way catalyst 2 and the downstream-side PF is the GPF 3 in the first embodiment, any other types of catalyst or PF are applicable. For example, the upstream-side catalyst may be an oxidation catalyst or the like. Also, in a case where the exhaust-gas purifying device 1 is applied to the diesel engine, a diesel particulate filter is useable as the PF.

As shown in FIG. 9, the three-way catalyst 2 is provided slightly below the GPF 3 in the first embodiment. In this regard, the three-way catalyst 2 may be located substantially at the same level as the GPF 3 or at a higher level than the GPF 3. In any case of these, however, an attachment position of the various sensors or the like, such as the seat portion 44 or the wall portion 42A, can be set at any appropriate position so that the exhaust-gas flow of the side of the bottom portion 4E, the first connection member 40, or the like is uniformized, not limited to the side of the top portion 4D of the exhaust pipe 4.

While the downstream end outlet of the exhaust manifold M is provided on the side of the first cylinder, in the cylinder row direction, of the engine and the upstream-side opening 4A of the L-shaped exhaust pipe 4 is directed to the side of the first cylinder in the cylinder row direction according to the first embodiment, the upstream-side opening 4A may be directed to any other direction according to the vehicle layout, for example, directed to the fourth-cylinder side, the upward side, or the downward side.

In the first embodiment, the downstream end outlet of the exhaust manifold M is arranged on the rightward side in the cylinder row direction and the exhaust pipe 4 is configured such that the upstream-side opening 4A is arranged on the rightward side as shown in FIG. 6. Herein, the upstream-side opening 4A may be provided to be directed to any other direction, toward the four-cylinder side, for example.

The exhaust device of the engine according to the present invention can properly improve and stabilize the detection accuracy of the pressure difference by suppressing the improper influence of the exhaust-gas flow.

What is claimed is:

1. An exhaust device of an engine, comprising:
a particulate filter provided on an exhaust path of the engine and comprising a filter body to trap a particulate contained in exhaust gas which is discharged from the engine and a filter case housing the filter body; and
a pressure-difference detector to detect a pressure difference between the exhaust gas positioned on an upstream side, in an exhaust-gas flow direction, of the filter body and the exhaust gas positioned on a downstream side, in the exhaust-gas flow direction, of the filter body,
wherein said pressure-difference detector comprises an upstream-side exhaust-gas takeout portion which takes out a portion of the exhaust gas positioned on the upstream side, in the exhaust-gas flow direction, of the filter body, a downstream-side exhaust-gas takeout portion which takes out a portion of the exhaust gas positioned on the downstream side, in the exhaust-gas flow direction, of the filter body, and a pressure-difference sensor to detect the pressure difference of the portion of the exhaust gas taken out by said upstream-side exhaust-gas takeout portion and the portion of the exhaust gas taken out by said downstream-side exhaust-gas takeout portion,
an exhaust-gas discharge port and an EGR-gas takeout port are provided at a downstream-side end portion of said filter case,
a center axis of the exhaust-gas discharge port is provided at a position which is offset from a center axis of said filter body,
the EGR-gas takeout port is provided at a position which is offset from the center axis of the filter body on a side of the center axis of the filter body that is opposite the position of the center axis of the exhaust-gas discharge port to thereby suppress influence of a dynamic pressure of the exhaust gas flow directed to the exhaust-gas discharge port and the EGR-gas takeout port, and
the downstream-side exhaust-gas takeout portion of said pressure-difference detector is provided between said exhaust-gas discharge port and said EGR-gas takeout port at said downstream-side end portion of the filter case.

2. The exhaust device of the engine of claim 1, further comprising an L-shaped exhaust pipe connected to an upstream side, in the exhaust-gas flow direction, of said filter case and configured to be bent in a L shape,
- wherein a step portion which is recessed outward is provided at a portion of an outer-periphery side wall of L-shaped bending of said L-shaped exhaust pipe which is spaced apart, on a side of said filter body, from a L-shaped bending portion of the L-shaped exhaust pipe, and
- the upstream-side exhaust-gas takeout portion of said pressure-difference detector is provided at said step portion of the L-shaped exhaust pipe.

3. The exhaust device of the engine of claim 2, wherein a catalyst to purify the exhaust gas is connected to an upstream-side portion of said L-shaped exhaust pipe, and a downstream-side portion of said catalyst is configured to overlap a portion of an upstream-side end face of said filter body, when viewed in an axial direction of said particulate filter.

4. The exhaust device of the engine of claim 1, wherein said particulate filter is disposed laterally such that the exhaust gas passes through the particulate filter in a lateral direction, an L-shaped exhaust pipe which is connected to an upstream side, in the exhaust-gas flow direction, of said filter case and configured to be bent in a L shape is provided, the upstream-side exhaust-gas takeout portion and the downstream-side exhaust-gas takeout portion of said pressure-difference detector are respectively provided at a lower portion of said L-shaped exhaust pipe and a lower portion of said downstream-side end portion of the filter case, and the pressure-difference sensor of the pressure-difference detector is provided around an upper side of the particulate filter.

5. The exhaust device of the engine of claim 2, further comprising:
- an EGR-gas takeout pipe connected to said EGR-gas takeout port and provided to pass beside said particulate filter which corresponds to an outer-periphery side of the L-shaped bending of said L-shaped exhaust pipe;
- an EGR-pipe support member provided beside the particulate filter and supporting said EGR-gas takeout pipe;
- an upstream-side exhaust-gas takeout pipe connecting said upstream-side exhaust-gas takeout portion and said pressure-difference sensor; and
- a takeout-pipe support member fixed to said EGR-gas takeout pipe and supporting said upstream-side exhaust-gas takeout pipe.

* * * * *